(12) United States Patent
Yun

(10) Patent No.: US 6,682,161 B2
(45) Date of Patent: Jan. 27, 2004

(54) INSTALLATION STRUCTURE FOR DISPLAY UNIT OF REFRIGERATOR

(75) Inventor: Keyong-Seok Yun, Changwon Gyeongnam (KR)

(73) Assignee: LG Electronics Inc., Seoul (KR)

(*) Notice: Subject to any disclaimer, the term of this patent is extended or adjusted under 35 U.S.C. 154(b) by 135 days.

(21) Appl. No.: 09/881,674

(22) Filed: Jun. 18, 2001

(65) Prior Publication Data

US 2001/0052741 A1 Dec. 20, 2001

(30) Foreign Application Priority Data

Jun. 19, 2000 (KR) .................................. 2000-33709

(51) Int. Cl.[7] .............................................. A47B 96/04
(52) U.S. Cl. ........................ 312/405; 312/319.2; 16/334
(58) Field of Search ................................ 312/401, 405, 312/406, 319.5, 319.6, 319.7, 319.1, 319.2, 319.3, 324, 307, 326, 327, 329; 62/125, 126, 131, 127, 128, 129, 130; 236/94; 16/334, 357, 361

(56) References Cited

U.S. PATENT DOCUMENTS

| | | | |
|---|---|---|---|
| 4,305,160 A | * | 12/1981 | Sundahl .................... 16/334 X |
| 4,490,986 A | * | 1/1985 | Paddock ..................... 62/127 |
| 4,814,759 A | * | 3/1989 | Gombrich et al. .......... 361/681 |
| 4,936,106 A | * | 6/1990 | Beach, Jr. et al. .......... 62/131 |
| 5,321,579 A | * | 6/1994 | Brown et al. ........ 312/223.3 X |
| 5,507,013 A | * | 4/1996 | Weadon et al. ........... 16/334 X |
| 5,862,468 A | * | 1/1999 | Kim ........................... 312/7.1 |
| 5,901,564 A | * | 5/1999 | Comeau, II ................... 62/264 |
| 6,012,201 A | * | 1/2000 | Mitts et al. ................... 16/334 |
| 6,012,785 A | * | 1/2000 | Kawasaki ............ 312/319.7 X |
| 6,125,030 A | * | 9/2000 | Mola et al. ............... 16/357 X |
| 6,353,968 B1 | * | 3/2002 | Shyu et al. ................... 16/334 |

FOREIGN PATENT DOCUMENTS

| | | | | |
|---|---|---|---|---|
| DE | 3330587 | * | 3/1985 | |
| DE | 3520272 | * | 12/1986 | |
| DE | 9416709 | * | 1/1995 | |
| JP | 54039256 | * | 3/1979 | ................. 62/125 |
| JP | 2000275612 | * | 10/2000 | |

* cited by examiner

*Primary Examiner*—Lanna Mai
*Assistant Examiner*—Hanh V. Tran
(74) *Attorney, Agent, or Firm*—Fleshner & Kim, LLP

(57) ABSTRACT

A display unit is provided which is configured to be installed in a front surface of a door of a refrigerator such that its installation angle can be adjusted. That is, an installing structure is provided for a display unit of a refrigerator for tiltably installing the display unit in the front surface of a door of the refrigerator. The installation structure includes an accommodating portion recessed into the front surface of the door for receiving the display unit, a supporting device for supporting both sides of the display unit so that a vertical tilt of the display unit can be adjusted within the accommodating portion, and a fixing device for securing and supporting the display unit, which has pivoted on the supporting device, at a predetermined tilted position. One advantage is that an installation angle can be adjusted so that a user can view clearest scenes on the display unit at the installation angle.

15 Claims, 6 Drawing Sheets

INSTALLATION STRUCTURE FOR DISPLAY UNIT OF REFRIGERATOR

FIELD OF THE INVENTION

The present invention relates to a refrigerator, and more particularly, to an installation structure for a display unit of a refrigerator, wherein an installation angle of the display unit mounted in the refrigerator can be adjusted and the display unit can be secured at the adjusted angle.

BACKGROUND OF THE INVENTION

Recently, since there is a growing tendency for household electric appliances to be updated, a refrigerator including a display unit having input and output functions has been developed and placed on the market. Such display unit of the refrigerator has the output function by which signals received from the exterior or a control portion of the refrigerator are visually displayed on a screen, and the input function by which a user can operate the refrigerator through the display unit. With such constitution, while utilizing the refrigerator, the user can perform various kinds of works such as television watching or connection with the internet and can control the refrigerator while visually confirming the operating state of the refrigerator. Thus, the user can obtain convenience of use, easy operability and a feeling of satisfaction in use.

FIG. 1 shows a conventional refrigerator with a display unit 1 installed therein. As shown in the figure, the display unit 1 is generally installed in a door 2 of the refrigerator and connected with a control portion 4 installed on one side of a main body 3 of the refrigerator.

The control portion 4 is a part for controlling the entire function of the refrigerator. The control portion 4 is formed with an input portion (not shown) connected with the exterior. Therefore, signals inputted from the exterior and signals for controlling the operating state of the refrigerator are transmitted, through the control portion 4, to the display unit 1. Signals outputted from the display unit 1 by the operation of the user are also transmitted, through the control portion 4, to the exterior or respective components of the refrigerator so as to control the refrigerator.

The display unit 1 is installed within a frame 1a made of material such as synthetic resin, with a front surface thereof defined by a displaying portion 1b for outputting scenes. In order to minimize the volume of the display unit 1, a liquid crystal display panel is generally used as the displaying portion 1b.

Next, referring to an installation structure for the display unit 1, an outer case of the door 2 of the refrigerator is formed with a rectangular accommodating portion 2a recessed thereinto. The display unit 1 is installed within the accommodating portion 2a. A rear surface of the display unit 1 is in close contact with an inner front surface of the accommodating portion 2a and secured thereon by a plurality of fasteners (not shown) or the like.

However, the conventional installation structure has disadvantages as follows. The liquid crystal display panel 1b used for minimization of the volume of the display unit 1 has high reflectivity for light. That is, clearness of scenes on the liquid crystal display panel is different depending on directions of viewing them. Thus, in order to ensure optimal clearness, it is necessary to adjust the slope of the liquid crystal display panel 1b by changing its installation angle of the display unit 1 in accordance with the position of a user.

However, in a case where the display unit 1 is fixed in the same manner as the prior art, since it is impossible to change the installation angle of the display unit 1 as described above, the user can view clear scenes on the display panel only at a predetermined position. At the other positions, the user can merely view unclear scenes on the display panel. Thus, there is a problem in that dissatisfaction in use occurs.

SUMMARY OF THE INVENTION

Accordingly, the present invention is contemplated to solve the above problem. An object of the present invention is to provide an installation structure for a display unit of a refrigerator, wherein the tilt angle of the display unit can be adjusted.

Another object of the present invention is to provide an installation structure for a display unit of a refrigerator, which can be easily dismounted if necessary.

According to the present invention for achieving the above objects, there is provided an installation structure for a display unit of a refrigerator for tiltably installing the display unit in a front surface of a door of the refrigerator. The installation structure comprises an accommodating portion recessed into the front surface of the door for receiving the display unit; a supporting means for supporting both sides of the display unit so that a vertical tilt of the display unit can be adjusted within the accommodating portion; and a fixing means for securing and supporting the display unit, which has pivoted on the supporting means, at a predetermined tilted position.

According to one embodiment of the supporting means, the supporting means includes a pair of hinge shafts protruding from the both sides of the display unit, and a pair of hinge recesses located at both sides of the accommodating portion for pivotably receiving the hinge shafts.

According to one embodiment of the fixing means, the fixing means includes fixing projections formed on the both sides of the display unit, and elastic means for elastically biasing the fixing projections against the both sides of the accommodating portion, thereby keeping the display unit at an angle of the tilted position by means of pushing force of the fixing projections that press on the both sides of the accommodating portion due to elastic force of the elastic means.

Further, according to one embodiment of the present invention, the hinge shafts are formed at upper ends of the both sides of the display unit, and the fixing projections are formed at positions below the hinge shafts on the both sides of the display unit.

Moreover, the both sides of the accommodating portion with which the fixing projections are in close contact may be formed with arc-shaped guide grooves for defining some portion of pivoting trajectories of the fixing projections.

Additionally, according to one embodiment of the present invention, each of the guide grooves is formed with a plurality of fixing recesses at a constant interval in which a leading end of the fixing projection is selectively seated.

Furthermore, it is preferable that leading ends of the fixing projections be shaped in the form of a hemisphere.

According to the present invention, the vertical tilt angle of the display unit installed in the front surface of the door of the refrigerator can be adjusted. Thus, there is an advantage in that the tilt angle can be adjusted so that the user can view clearest scenes on the display unit.

DETAILED DESCRIPTION FOR PREFERRED EMBODIMENT

Hereinafter, preferred embodiments of the present invention will be explained in detail with reference to the accompanying drawings.

Figure 1:
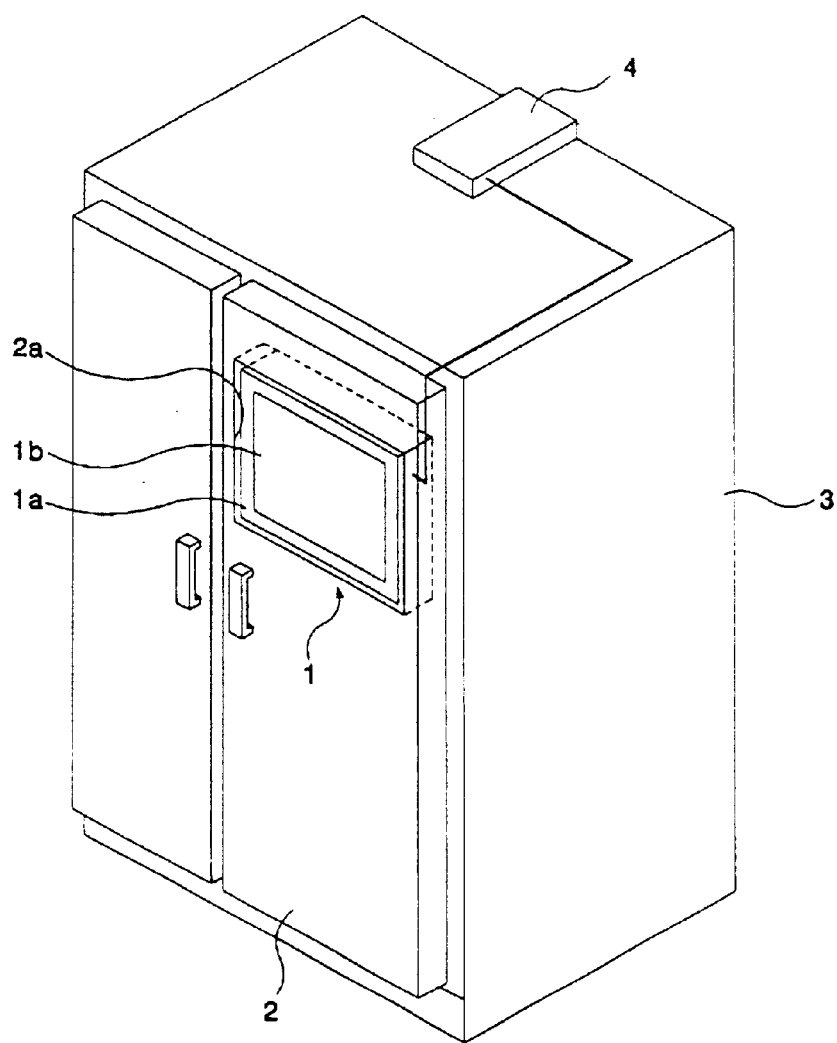
FIG. 1 is a schematic perspective view showing a conventional installation structure for a display unit of a refrigerator.
Figure 2A:
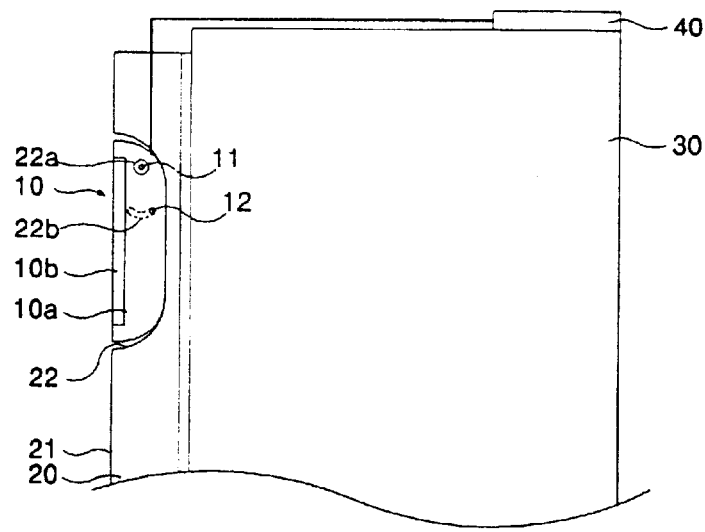
FIG. 2a is a partially sectioned side view showing an installation structure for a display unit of a refrigerator according to the present invention.
Figure 2B:
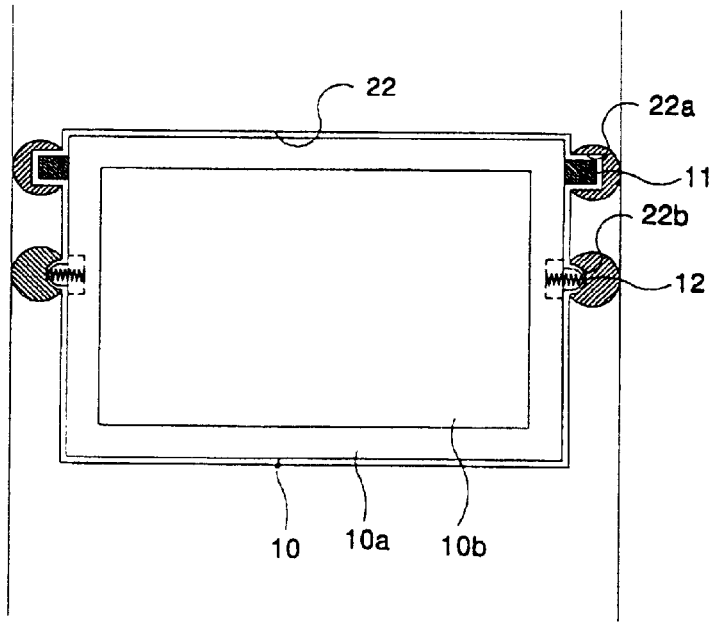
FIG. 2b a partially sectioned front view showing the installation structure for the display unit of the refrigerator according to the present invention.

FIG. 2a is a partially and longitudinally sectioned side view of a refrigerator to which an installation structure for a display unit according to the present invention is applied, and FIG. 2b is a partially sectioned front view. As shown in the figures, an outer case 21 of a door 20 of a refrigerator is formed with a rectangular accommodating portion 22 recessed thereinto at a front surface of the outer case. A display unit 10 is installed within the accommodating portion 22. The display unit 10 is connected with a control portion 40 installed on one side of a main body 30 of the refrigerator, so that it outputs signals received from the control portion 40 or transmits signals to the control portion in response to the operation of a user.

The display unit 10 is a type in which a liquid crystal display panel 10b for outputting scenes is installed within a frame 10a. Each upper end on both sides of the frame 10a is formed with a hinge shaft 11 for pivotably supporting the frame, and is connected to both sides of the accommodating portion 22 via the hinge shafts 11. Thus, the display unit 10 is supported by the hinge shafts 11 so that a lower portion of the display unit 10 can pivot on the hinge shafts 11 as supporting shafts.

The hinge shafts 11 are components for adjusting an installation angle of the display unit 10. When the display unit 10 has been installed in the accommodating portion 22, the hinge shafts 11 allow the display unit 10 to pivot on the hinge shafts 11 so that the installation angle of the display unit 10 can be adjusted. When taking such a function into consideration, it is preferable that the shapes of rearward upper and lower ends of the display unit 10 and the shapes of portions of the accommodating portion 22 corresponding thereto be rounded as shown in FIG. 2a in order to facilitate the pivoting of the display unit.

Figure 3A:
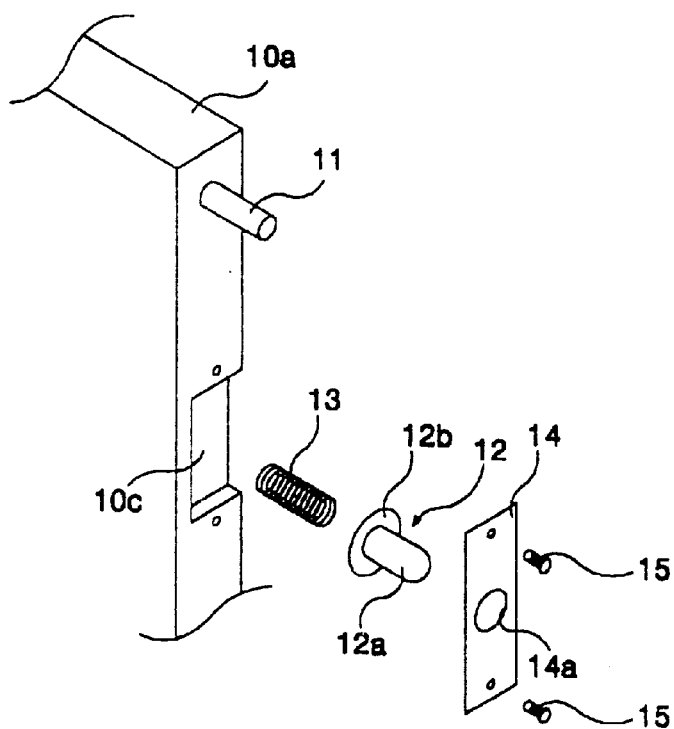
FIG. 3a is an exploded partial perspective view showing a side structure of the display unit according to the present invention.

Further, a pair of fixing projections 12, which are constructed to be inserted into the frame 10a and returned back, protrude from portions below the hinge shafts of the frame 10a. The fixing projections 12 protrude from the interior of the frame 10a beyond both sides of the frame 10a. Referring to the constitution of the fixing projection 12 with reference to FIG. 3a, a supporting groove portion 10c recessed inwardly of the frame 10a is formed on a predetermined position below the hinge shaft 11. A cover 14 having a passage hole 14a formed therein is placed on and coupled on the supporting groove portion 10c by fasteners 15.

The fixing projection 12 includes a protruding portion 12a which protrudes through the passage hole 14a of the cover 14, and a flange 12b which is in close contact with an inner surface of the cover 14 in order to prevent the fixing projection 12 from coming off through the passage hole 14a.

Moreover, an elastic member 13 such as a spring is disposed between the fixing projection 12 and the supporting groove portion 10c so that the fixing projection 12 may protrude toward the exterior of the frame 10c. That is, the fixing projection 12 is supported by the elastic member 13, which is installed in a compressed state due to the coupling of the cover 14 with the supporting groove portion 10a, so that the protruding portion 12a protrudes through the passage hole 14 toward the exterior of the frame 10a. Therefore, the fixing projection 12 retracts inwardly of the frame 10a upon receipt of external depression force, and returns back to protrude toward the exterior upon release of the external force.

Next, each side surface of the accommodating portion 22 of the door 20 of the refrigerator is formed with a hinge recess 22a at a position corresponding to the hinge shaft 11 and also with an arc-shaped guide groove 22b at a position corresponding to the fixing projection 12, upon installation of the display unit 10.

The hinge recess 22a is a component for receiving the hinge shaft 11 of the display unit 10 and pivotably supporting the display unit 10. The installation angle of the display unit 10 can be adjusted by inserting the hinge shaft 11 of the display unit 10 into the hinge recess 22a and pivoting the display unit 10 on the hinge shaft 11. With such constitution, the tilt angle of the display unit 10 can be controlled in practice.

Figure 3B:
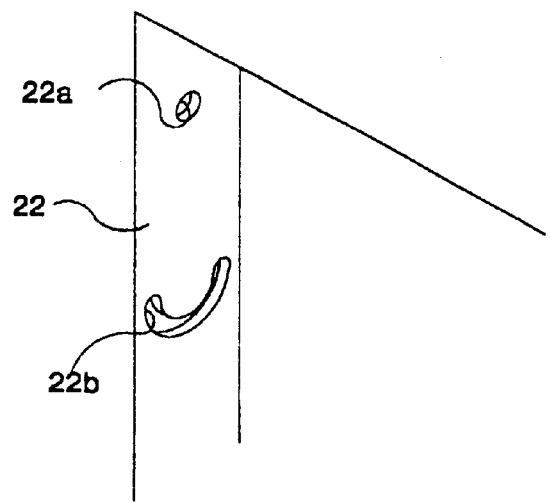
FIG. 3b is a partial perspective view showing a side structure of an accommodating portion for the display unit according to the present invention.

The guide groove 22b is a portion for receiving the fixing projection 12, and is made in the form of an arc corresponding to the shape of a moving trajectory of the fixing projection 12 when the display unit 10 pivots on the hinge shaft 11, as shown in FIG. 3b. Therefore, upon pivoting of the display unit 10, the fixing projection 12 can easily move along the guide groove 22b.

Figure 4:
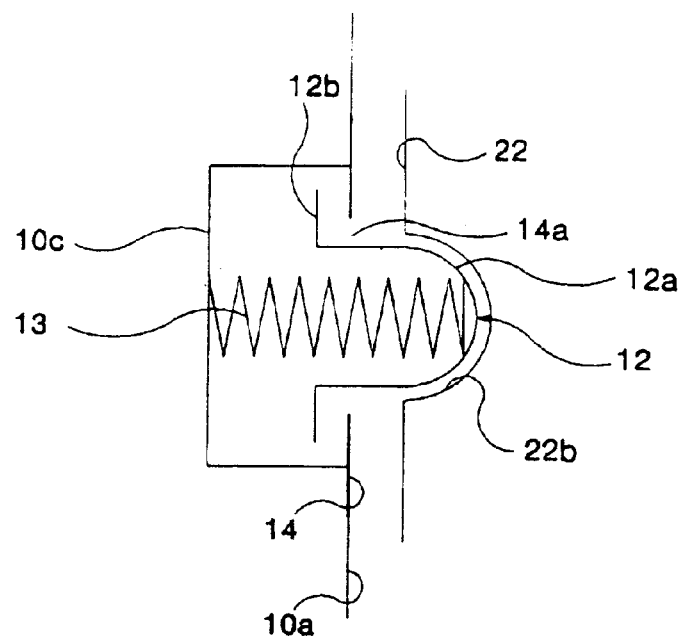
FIG. 4 is a sectional side view schematically showing the constitution of a fixing portion according to a first embodiment of the present invention.

Additionally, the guide groove 22b has a depth sufficient for applying a certain degree of compression force to the fixing projection 12 with the fixing projection 12 inserted into the guide groove 22b. That is, as shown in FIG. 4, under the condition that the fixing projection 12 is inserted into the guide groove 22b, the fixing projection 12 goes into the frame 10a since the protruding portion 12a is pressed by an inner surface of the guide groove 22b, and the elastic member 13 supporting the fixing projection 12 produces supporting force due to its compression. With such constitution, since the protruding portion 12a of the fixing projection 12 is pressed to be close in contact with the inner surface of the guide groove 22b by the elastic force of the elastic member 13, the position of the display unit 10 can be fixed.

Therefore, it is possible to adjust the installation angle of the display unit 10 by pivoting the display unit 10 on the hinge shaft 11 and to fix the display unit 10 at a pivoted position by the close contact of the fixing projection 12 and the guide groove 22b.

The operation of the embodiment of the present invention constructed as such will be described in detail with reference to the drawings.

Figure 5A:
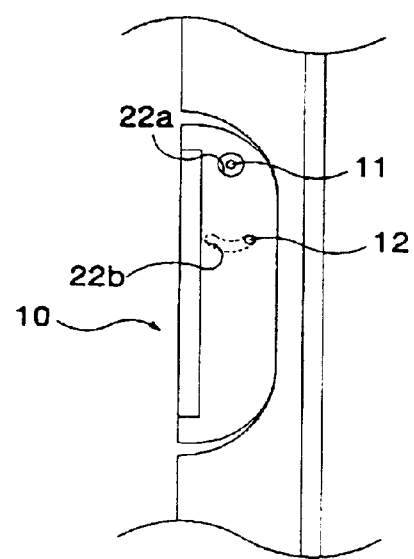
FIGS. 5a and 5b are state views showing operating states of the installation structure for the display unit according to the present invention.
Figure 5B:
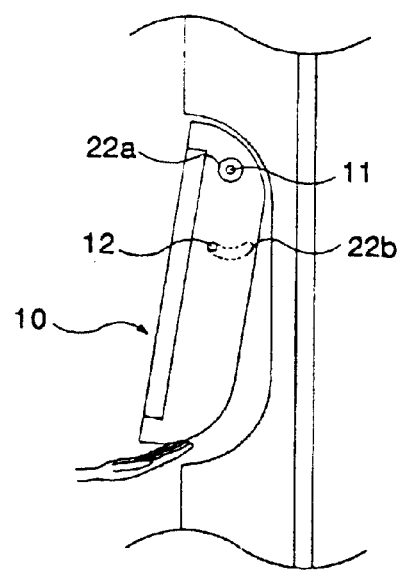

FIGS. 5a and 5b show operating states of the display unit according to the present invention. As shown in the figures, under the condition that the display unit 10 is installed in the refrigerator, a rear surface of the display unit 10 is in close contact with the inner front surface of the accommodating portion 22 at an initial position of the display unit as shown in FIG. 5a.

In such state, if a user intends to adjust the installation angle of the display unit 10, the user pulls the lower portion of the display unit 10 so that the display unit 10 pivots on the hinge shafts 11. At this time, the fixing projection 12 moves along the arc-shaped guide groove 22b and allows the display unit 10 to pivot within the range of the guide groove 22b.

Further, when the display unit 10 is stopped in a state where the installation angle of the display unit reaches a position in which the scenes displayed on the liquid crystal display panel 10b of the display unit 10 have optimal clearness, the fixing projection 12 is supported elastically by the inward elastic member 13 and the protruding portion 12a is in close contact with the inner surface of the guide groove 22b so that the display unit 10 is fixed in this state, as shown in FIG. 5b. Therefore, the user can view the clear scenes on the display unit 10 at a desire position.

In addition, it is preferable that a leading end of the protruding portion 12a be rounded so that the fixing projection 12 can be easily slid in the guide groove 22b.

As discussed above, the subject matter of the present invention is to construct the display unit such that the display unit can pivot on the hinge shaft to adjust the installation angle of the display unit and can be fixed at a changed installation angle by a separate supporting structure provided to the display unit.

It should be appreciated that a person having an ordinary skill in the art may make various changes to the present invention within the technical scope described above.

For example, although the display unit 10 has been constructed such that its installation angle can be adjusted upwardly by the hinge shafts 11 formed at the upper end of the display unit 10 and by the fixing projections 12 formed below the hinge shafts in the above embodiment, the display unit 10 may be constructed such that its installation angle can be adjusted downwardly by the hinge shafts 11 formed at a lower end of the display unit 10 and by the fixing projections 12 formed above the hinge shafts 11 so as to support the weight of the display unit 10. Accordingly, the positions where the hinge shafts 11 and the fixing projections 12 are formed should not be limited in this way.

Moreover, although the display unit 10 is formed with the hinge shafts 11 and the accommodating portion 22 is formed with the hinge recesses 22a into which the hinge shafts 11 are inserted in the above embodiment, the hinge shafts 11 may be formed in the accommodating portion 22 and the hinge recesses 22a may be formed in the display unit 10.

Furthermore, although in the above embodiment, the fixing projections 12 of which inner portions are supported by the elastic members 13 are formed as a means for securing the position of the display unit 10, this is merely one example of the present invention. Thus, any means capable of securing the position of the display unit 10 can be employed in the present invention.

Figure 6:
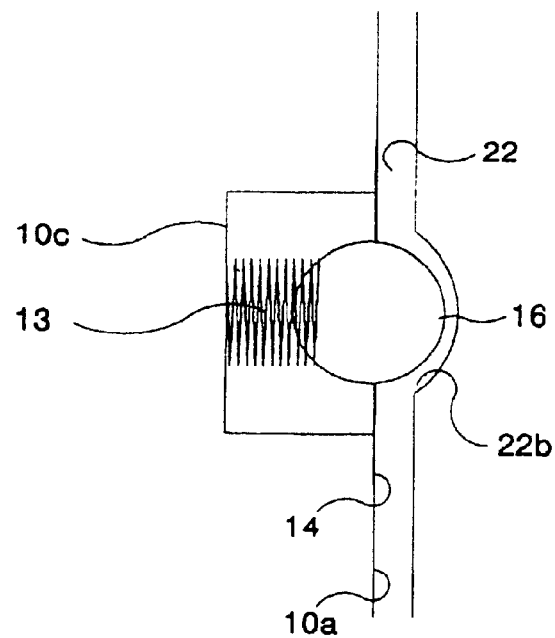
FIG. 6 is a sectional side view schematically showing the constitution of a fixing portion according to a second embodiment of the present invention.

For example, as shown in FIG. 6, it is possible to substitute the fixing projection 12 in the form of a cap with a spherical ball 16, contrary to the above embodiment. In such case, the diameter of the passage hole 14a of the cover 14 should be less than that of the ball 16 to prevent the ball 16 from coming off.

Figure 7A:
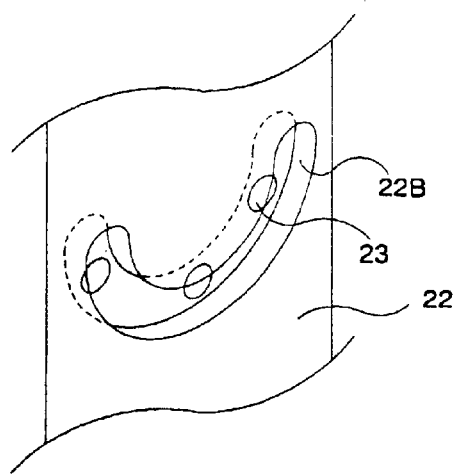
FIGS. 7a and 7b are a partial perspective view and a partially sectioned plan view schematically showing the constitution of a guide groove according to a third embodiment of the present invention.
Figure 7B:
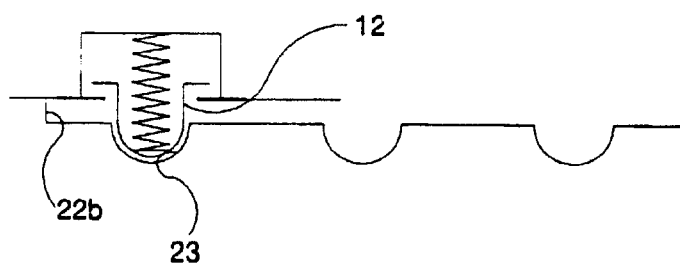

As shown in FIGS. 7a and 7b, in a case where a plurality of fixing recesses 23 in which a leading end of the fixing projection 12 can be seated are formed at a constant interval in the guide groove 22b, the leading end of the fixing projection 12 elastically enters the relevant fixing recess 23 and stops thereat. With such constitution, since the fixing projection 12 is prevented from being arbitrarily and easily slid in the guide groove 22b, there is an advantage in that the position of the display unit 10 can be more firmly fixed. In such case, it is preferable that the fixing recess 23 be shaped in the form of a hemisphere and the leading end of the fixing projection 12 be rounded, so that the fixing projection 12 can be easily inserted into and slidingly come off the fixing recess 23 in response to the operation of the user.

As described above, according to the present invention, it is possible to adjust the tilt angle of the display unit installed in the refrigerator in accordance with a request of the user. Thus, the user can utilize the display unit by adjusting it such that the scenes on the display unit have optimal clearness. Consequently, the user can obtain convenience of use and a feeling of satisfaction in use.

Further, the display unit of the present invention is constructed such that it is not fixed to but movably installed in the refrigerator by means of a simple fastening structure including the hinge shafts and the fixing projections. Thus, in a case where it is necessary to dismount the display unit such as a case of a repair on the display unit, the display unit can be easily dismounted, and an advantage that the maintenance thereof is conveniently made can be consequently obtained.

What is claimed is:

1. An installing structure for a display unit of a refrigerator for tiltably installing said display unit in a front surface of a door of said refrigerator, comprising:

an accommodating portion recessed into said front surface of said door for receiving said display unit;

a supporting means for supporting both sides of said display unit so that a vertical tilt of said display unit can be adjusted within said accommodating portion between a substantially vertical position with respect to a longitudinal axis of the refrigerator and a tilted position in which a bottom portion of the display unit has been tilted forward; and a fixing means for securing and supporting said display unit, which has pivoted on said supporting means, at the tilted position, wherein said supporting means includes a pair of hinge shafts protruding from both sides of said display unit, and a pair of hinge recesses located at both sides of said accommodating portion for pivotably receiving said hinge shafts, and wherein said fixing means includes fixing projections formed on said both sides of said display unit, and elastic means for elastically biasing said fixing projections against said both sides of said accommodating portion, thereby keeping said display unit at an angle of said tilted position by means of pushing force of said fixing projections that press on said both sides of said accommodating portion due to elastic force of said elastic means.

2. The installation structure as claimed in claim 1, wherein said hinge shafts are formed at upper ends of said both sides of said display unit, and said fixing projections are formed at positions below said hinge shafts on said both sides of said display unit.

3. The installation structure as claimed in claim 1, wherein said both sides of said accommodating portion with which said fixing projections are in close contact are formed with arc-shaped guide grooves for defining some portions of pivoting trajectories of said fixing projections.

4. The installation structure as claimed in claim 3, wherein each of said guide grooves is formed with a plurality of fixing recesses at a constant interval in which a leading end of said fixing projection is selectively seated.

5. The installation structure as claimed in claim 3, wherein leading ends of said fixing projections are shaped in the form of a hemisphere.

6. An installing structure for a display unit of a refrigerator, comprising:

an accommodating portion recessed into a front surface of a door of the refrigerator and configured to receive the display unit therein;

at least one supporting device configured to support the display unit so that the display unit can be adjusted within the accommodating portion between a substantially vertical position with respect to a longitudinal axis of the refrigerator and a tilted position in which a bottom portion of the display unit has been tilted forward; and one or more fixing devices configured to secure and support the display unit, which has pivoted on the at least one supporting device, at the tilted position, wherein the at least one supporting device comprise a pair of hinge shafts protruding from sides of the display unit, and a pair of hinge recesses located at sides of the accommodating portion configured to pivotably receive the hinge shafts and wherein the one or more fixing devices comprises fixing projections formed on sides of the display unit, and corresponding elastic devices configured to elastically bias the fixing projections against sides of the accommodating portion, thereby keeping the display unit at the tilted position.

7. The installation structure as claimed in claim 6, wherein the hinge shafts are formed at upper ends of sides of the display unit, and the fixing projections are formed at positions below the hinge shafts on sides of the display unit.

8. The installation structure as claimed in claim 6, wherein the sides of the accommodating portion with which the fixing projections are in close contact are formed with arc-shaped guide grooves that define pivoting trajectories of the fixing projections.

9. The installation structure as claimed in claim 8, wherein the guide grooves comprise a plurality of fixing recesses positioned at constant intervals in one of which a leading end of a respective fixing projection is selectively seated.

10. The installation structure as claimed in claim 8, wherein leading ends of the fixing projections are shaped in the form of a hemisphere.

11. A refrigerator, comprising:

a main body;

a door openably attached to the main body;

a display unit; and an installing structure configured to tiltably install the display unit in a front surface of a door of the refrigerator, the installing structure comprising:

a recess on the front surface of the door and configured to receive the display unit therein;

at least one hinge configured to support the display unit so that a vertical tilt of the display unit can be adjusted within the recess; and at least one protrusion configured to frictionally secure and support the display unit, which has pivoted on the at least one hinge, at a predetermined tilted position, wherein the vertical tilt of the display unit can be adjusted within the recess between a substantially vertical position with respect to a longitudinal axis of the refrigerator and a tilted position in which a bottom portion of the display unit has been tilted forward, and wherein the at least one protrusion is spring-loaded, thereby keeping the display unit at the tilted position.

12. The refrigerator as claimed in claim 11, wherein at least one hinge comprises a pair of hinge shafts formed on the display unit, and a pair of hinge recesses located on inner walls of the recess and configured to pivotably receive the hinge shafts.

13. The refrigerator as claimed in claim 11, wherein the at least one protrusion is formed on one of the display unit and an inner wall of the recess, and mates with a corresponding groove formed on one of the display unit and an inner wall of the recess.

14. The refrigerator as claimed in claim 13, wherein the groove comprises an arc-shaped guide groove that define a pivoting trajectory of the at least one projection.

15. The refrigerator as claimed in claim 14, wherein the guide groove comprises a plurality of fixing recesses positioned at constant intervals in one of which a leading end of the at least one projection is selectively seated.

* * * * *